US008290819B2

(12) United States Patent
Bawcutt

(10) Patent No.: US 8,290,819 B2
(45) Date of Patent: Oct. 16, 2012

(54) ELECTRONIC COMMERCE TRANSACTIONS OVER A PEER-TO-PEER COMMUNICATIONS CHANNEL

(75) Inventor: Anthony J. Bawcutt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1521 days.

(21) Appl. No.: 11/477,961

(22) Filed: Jun. 29, 2006

(65) Prior Publication Data

US 2008/0004974 A1   Jan. 3, 2008

(51) Int. Cl.
*G06Q 30/00* (2006.01)
(52) U.S. Cl. ............... 705/26.1; 705/27.1; 705/26.41
(58) Field of Classification Search ............. 705/26, 705/27
See application file for complete search history.

(56) References Cited

U.S. PATENT DOCUMENTS

| | | | |
|---|---|---|---|
| 5,761,308 A * | 6/1998 | Torii et al. ............... | 705/52 |
| 5,884,027 A | 3/1999 | Garbus et al. | |
| 6,076,078 A | 6/2000 | Camp et al. | |
| 6,226,618 B1 * | 5/2001 | Downs et al. ............ | 705/51 |
| 6,547,134 B2 | 4/2003 | Ogilvie | |
| 6,701,303 B1 | 3/2004 | Dunn et al. | |
| 6,785,374 B2 | 8/2004 | Wang et al. | |
| 2002/0116337 A1 | 8/2002 | Peled et al. | |
| 2002/0123937 A1 * | 9/2002 | Pickover et al. ......... | 705/26 |
| 2002/0178087 A1 * | 11/2002 | Henderson et al. ...... | 705/26 |
| 2003/0023505 A1 * | 1/2003 | Eglen et al. .............. | 705/26 |
| 2003/0131121 A1 | 7/2003 | Quittek et al. | |
| 2004/0030651 A1 | 2/2004 | Kim et al. | |
| 2004/0034601 A1 | 2/2004 | Kreuzer | |
| 2004/0148228 A1 | 7/2004 | Kwei | |
| 2004/0170137 A1 * | 9/2004 | Seligmann ............... | 370/328 |
| 2004/0172279 A1 | 9/2004 | Carolan | |
| 2004/0181487 A1 * | 9/2004 | Hanson .................... | 705/52 |
| 2004/0233866 A1 | 11/2004 | Bossoli et al. | |
| 2005/0033774 A1 | 2/2005 | Brentano et al. | |
| 2005/0160095 A1 | 7/2005 | Dick et al. | |

FOREIGN PATENT DOCUMENTS

CN          1735223          2/2006
(Continued)

OTHER PUBLICATIONS

Peer Impact: peerimpact.com; Internet Archive Wayback Machine, www.archive.org; Jun. 2005-Jan. 2006, 18pgs.*

(Continued)

*Primary Examiner* — Robert M. Pond
(74) *Attorney, Agent, or Firm* — Hope Baldauff Hartman, LLC

(57) ABSTRACT

A system, method, apparatus, and computer-readable medium are provided for completing e-commerce transactions over a P2P communications channel. According to one method, a secure P2P communications channel is established between a buyer node and a seller node. A request to perform an e-commerce transaction is transmitted from the buyer node to the seller node. In response to the request, a third-party clearinghouse is added to the P2P communications channel. Once the clearinghouse has been added to the P2P communications channel, a request is transmitted to the clearinghouse over the P2P communications channel to charge an account associated with the buyer node. The clearinghouse charges an account associated with the buyer node for the purchase. The clearinghouse also transmits a confirmation over the P2P communications channel indicating that the charge has been completed. When the seller node receives the confirmation, the seller node delivers the purchased good to the buyer node over the P2P communications channel.

12 Claims, 9 Drawing Sheets

FOREIGN PATENT DOCUMENTS

| | | |
|---|---|---|
| EP | 1519537 A2 | 3/2005 |
| GB | 2373609 A | 9/2002 |
| KR | 1020040049892 A | 6/2004 |
| RU | 2157000 C2 | 9/2000 |
| WO | WO0108029 A2 | 2/2001 |
| WO | WO03073240 A1 | 9/2003 |
| WO | WO 2006-016332 | 2/2006 |

OTHER PUBLICATIONS

David Lane, "Instant Messaging Security", Dec. 2003, University of Westminister, http://david-lane.co.uk/work/MSc/thesis.pdf.

"Nokia OMA SIP/SIMPLE based solution", http://www.nokia.com/NOKIA_COM_1/Operators/Downloads/Nokia_Unified_Core_Network/SS%20Presence.pdf.

Yasusi Kanada, "Multi-Context voice communication in a sip/simple-based shared virtual sound room with early reflections",Central Research Laboritory, Tokyo, Japan, http://www.kanadas.com/voiscape/NOSSDAV2005.pdf.

International Search Report, PCT/US2007/004447,Dated Aug. 6, 2007, Total pp. 7.

"European Search Report", Mailed Date: Feb. 25, 2011, Application No. EP/07751221, pp. 5.

Russian Notice of Allowance dated Jun. 10, 2011 in Russian Application No. 2008152104.

Chinese Official Action May 5, 2011 in Chinese Application No. 200780024473.3.

Chinese Official Action dated Apr. 6, 2012 in Chinese Application No. 200780024473.3.

Russian Official Action dated Feb. 16, 2011 in Russian Application No. 2008152104/08 (068524).

Chinese Official Action dated May 5, 2011 in Chinese Application No. 200780024473.3.

European Official Action dated Jul. 24, 2012 in European Application No. 07751221.8.

\* cited by examiner

ELECTRONIC COMMERCE TRANSACTIONS OVER A PEER-TO-PEER COMMUNICATIONS CHANNEL

BACKGROUND

Instant messaging ("IM") has become an extremely popular way for people to communicate both in the home and in the workplace. Through the use of an IM client application program, a computer user can communicate with other IM users in a variety of ways. For instance, using a typical IM client application program, a user may engage in text, voice, or video communications with other IM users. IM users can also exchange or share electronic files and other information using an IM client application program. These communications may be encrypted for security, and also audited and indexed for compliance with various regulatory laws.

In many cases, IM functionality is enabled through the use of a peer-to-peer ("P2P") communications protocol. Using such a protocol, a secure P2P communications channel may be established between two or more network nodes or end points. The secure P2P communications channel may then be utilized to transmit all of the IM data, including the text, voice, and video communications, as well as other types of interaction including sharing applications and annotation. All of these types of communications may occur on the same secure P2P communications channel. Exchange and sharing of electronic files may also occur on the channel.

Although current IM solutions offer a great number of features, one area where current IM solutions suffer, however, is in the area of electronic commerce ("e-commerce"). Currently, if two users desire to enter into an e-commerce transaction, they must turn to another solution for verification, payment, and delivery. For instance, two computer users may utilize an IM session to engage in a text, voice, or video conversation. During the conversation, one user may agree to purchase a digital good, such as a document, from the other user. In this case, the users must exit the IM conversation and utilize a third-party service for identity verification, payment processing, merchandise escrow, and delivery of the digital good. This process can be inconvenient and time consuming for IM users.

It is with respect to these considerations and others that aspects of a computing system for performing e-commerce transactions over a P2P communications channel are described below.

SUMMARY

A system, apparatus, method, and computer-readable medium are provided for completing e-commerce transactions over a P2P communications channel. According to one aspect of the disclosure provided herein, the same P2P communications channel that is utilized for text, audio, or video communications can also be utilized to perform an e-commerce transaction. Identity verification, payment processing, merchandise escrow, and the delivery of goods may occur directly within the IM session using the P2P communications channel.

According to one method described herein, an e-commerce transaction is performed utilizing a P2P communications channel between a buyer node and a seller node. According to aspects of the method, a secure P2P communications channel is established between the two nodes. The secure P2P communications channel may be established using a P2P protocol, such as the Session Initiation Protocol for Instant Messaging and Presence Leveraging ("SIMPLE").

Once the secure P2P communications channel has been established, a request to perform the e-commerce transaction may be transmitted from the buyer node to the seller node. In response to such a request, a third-party clearinghouse is added to the P2P communications channel. The clearinghouse is a computer that is operative to verify the identity of the parties to the e-commerce transaction, perform payment processing and confirmation, and to assist in the delivery of the goods that are the subject of the transaction.

Once the clearinghouse has been added to the P2P communications channel, a request is transmitted to the clearinghouse over the P2P communications channel to charge an account associated with the buyer node. In response to such a request, the clearinghouse may authenticate the identity of the buyer node. For instance, a request may be transmitted to the buyer node over the P2P communications channel for authentication. In response, the buyer node may transmit authenticating data, such as a digital signature, to the clearinghouse.

Once the buyer node has been authenticated, the clearinghouse charges an account associated with the buyer node for the purchase. The clearinghouse also transmits a confirmation over the P2P communications channel indicating that the charge has been completed. When the seller node receives the confirmation, the seller node delivers the purchased good to the buyer. The good may be either a physical item that is delivered in a traditional fashion or may be a digital item, such as a document, that is delivered via the P2P communications channel.

In the case of a digital good that is delivered to the buyer node over the P2P communications channel, the digital good may be unencrypted or may be encrypted. An unencrypted digital good may be transmitted to the buyer node from either the seller node or the clearinghouse over the P2P communications channel. An encrypted good may also be transmitted directly to the buyer node from either the seller node or the clearinghouse. A key for decrypting the digital good may also be transmitted to the buyer node from the seller node or the clearinghouse.

When the buyer node receives the key, an attempt is made to decrypt the encrypted digital good. If the key successfully decrypts the good, a confirmation message is transmitted over the P2P communications channel to the clearinghouse and the seller node, thereby completing the transaction. If the key cannot decrypt the encrypted digital good, a request is transmitted over the P2P communications channel to cancel the transaction. In response to such a request, the clearinghouse may credit the account associated with the buyer node for the cancelled transaction.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
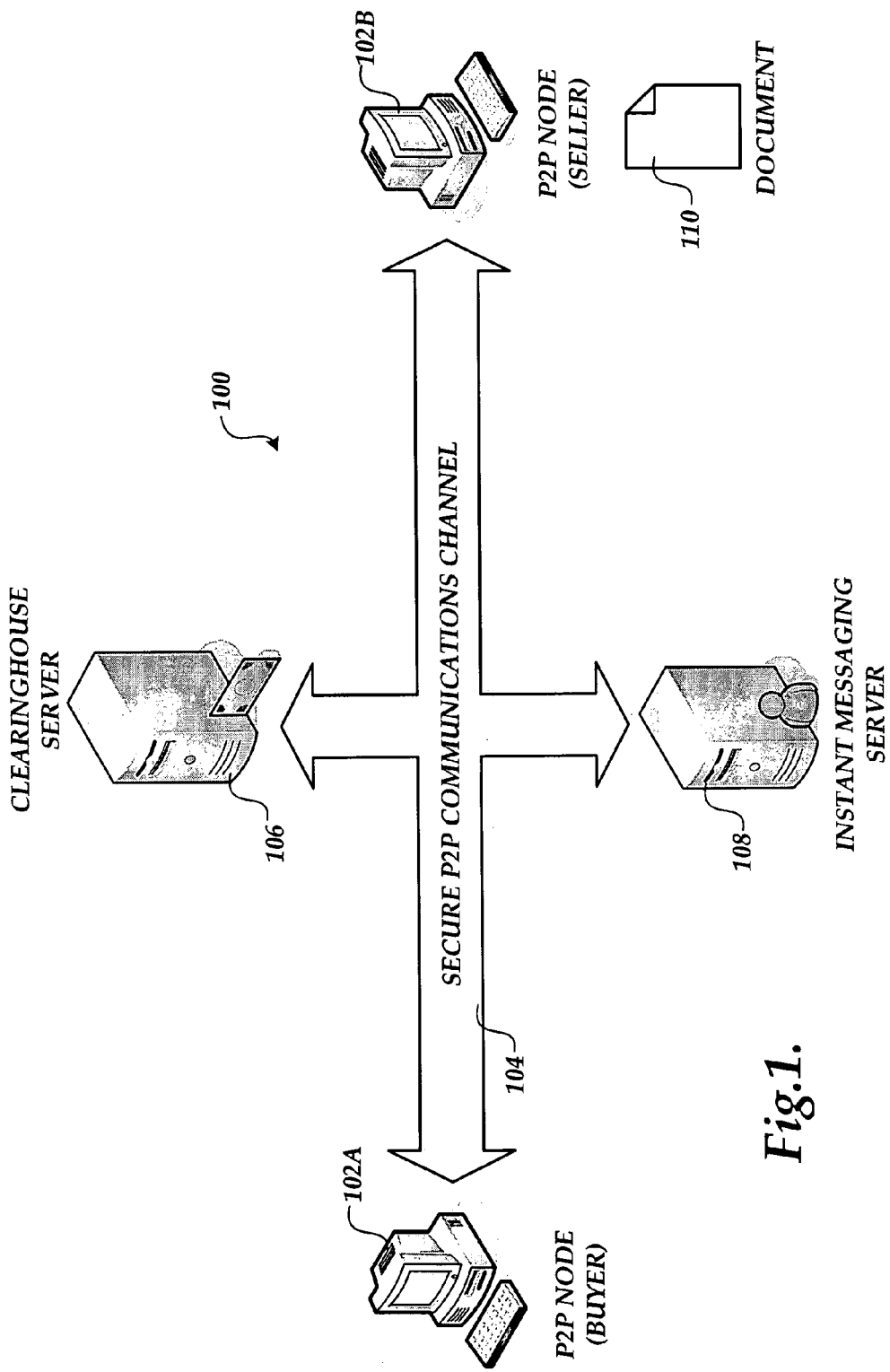
FIG. 1 is a network diagram showing an illustrative operating environment for the processes and computer systems described herein.

The following detailed description is directed to systems, methods, and computer-readable media for completing an e-commerce transaction via a P2P communications channel. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for completing an e-commerce transaction over a P2P communications channel will be described.

FIG. 1 shows aspects of an illustrative operative environment for the subject matter described herein. In particular, FIG. 1 is a network diagram illustrating aspects of a computing system for performing an e-commerce transaction over a P2P communications channel. The system includes two or more computer systems 102A-102B, referred to herein as "nodes", connected via a secure P2P communications channel 104. It should be appreciated that although a network is not shown in FIG. 1, or the other FIGURES, the computer systems shown in the FIGURES and described herein are connected by way of a suitable local area network ("LAN") or wide area network ("WAN").

In one implementation, one of the nodes 102B is associated with the seller of a good. For instance, in one embodiment, the good may comprise a digital good, such as an electronic document 110. The node 102A is associated with the buyer of the digital good. The digital good that is the subject of the e-commerce transaction may comprise any type of digital data. This includes, but is not limited to, documents, images, audio files, video clips, presentations, spreadsheets, web sites, web content, executable program files, and data files. It should also be appreciated that although the embodiments presented herein are described in the context of a transaction for digital goods, the embodiments of the invention also apply to the exchange of physical goods. In the case of an e-commerce transaction for physical goods, the actual exchange and transfer of the property is accomplished utilizing traditional delivery methods. The embodiments described herein may also be utilized to obtain a license for a digital good.

According to one implementation presented herein, the nodes 102A-102B utilize an IM client application to create the secure P2P communications channel 104. The IM client application also enables text and other types of data communications between the nodes 102A-102B. An instant messaging server computer 108 may be utilized in conjunction with the IM client applications executing on the nodes 102A-102B to provide information regarding presence, state changes, and the willingness of users of the nodes 102A-102B to communicate. The IM server 108 may also assist in establishing a connection between the nodes 102A-102B. It should be appreciated that these functions may be integrated into the operation of the clearinghouse server 106, described below. Alternatively, the functions of the clearinghouse server 106 may be integrated into the operation of the IM server 108. Although communications with the IM server 108 are shown in FIG. 1 as being performed over the P2P communications channel 104, it should be appreciated that these communications may take place out-of-band.

As will be described in greater detail below, data may be transmitted from the buyer node 102A to the seller node 102B indicating an intent to purchase a digital good, such as the document 110. In response to receiving such a request, the seller node 102B is operative to extend the communications session with the node 102A to also include the clearinghouse server 106. In particular, the clearinghouse server 106 is added to the P2P communications channel 104. Once the clearinghouse server 106 has joined, it will receive all communications on the P2P communications channel 104 from the nodes 102A-102B, and both nodes 102A-102B will receive all communications from the clearinghouse server 106.

The clearinghouse server 106 provides functionality for acting as a mediator for the e-commerce transaction, performing backend settlement and physical payment processing, and for validating transfer, receipt, and conformance of the goods. Even though the session may be very short, the clearinghouse server 106 can also perform escrow functions. Additional details regarding the operation of the clearinghouse server 106 are provided below.

Once the clearinghouse server 106 has joined the P2P communications channel 104, the seller node 102B transmits to the clearinghouse server 106 a request to charge an account associated with the buyer node 102A for the digital good. The operator of the node 102A may have a pre-existing relationship with the operator of the clearinghouse server 106 or may be required to create a relationship at the time of purchase. In response to receiving a request to charge the buyer for the digital good, the clearinghouse server 106 may attempt to authenticate the buyer node 102A. If the buyer node 102A can be authenticated, the clearinghouse server 106 charges the account associated with the node 106A and transmits a confirmation message to the parties.

In response to receiving the confirmation message, the seller node 102B transmits the digital good to the buyer node 102A. For instance, the document 110 may be transmitted to the buyer node 102A over the P2P communications channel 104. The digital good may be unencrypted or may be encrypted. A key for decrypting the digital good may also be transmitted to the buyer node 102A from the seller node 102B or the clearinghouse server 106.

When the buyer node 102A receives the key, an attempt is made to decrypt the encrypted digital good. If the key successfully decrypts the good, a confirmation message is transmitted over the P2P communications channel 104 to the clearinghouse server 106 and the seller node 102B, thereby completing the transaction. If the key cannot decrypt the encrypted digital good, a request is transmitted to the clearinghouse server 106 over the P2P communications channel 104 to cancel the transaction. In response to such a request, the clearinghouse server 106 may credit the account associated with the buyer node 102A for the cancelled transaction. Additional details regarding this process will be provided below with respect to FIGS. 2-8.

In one embodiment described herein, SIMPLE is utilized as the P2P protocol for communication between the nodes 102A-102B and the clearinghouse server 106. SIMPLE is an extension of the Session Initiation Protocol ("SIP") that provides a P2P communications protocol for establishing a secure, encrypted communications channel between two or more nodes for the exchange of internet protocol ("IP") traffic. Typically, the channel is utilized to exchange communications payloads such as text messaging, voice, and video data. It can also be utilized to exchange electronic files and can communicate certain information about state and presence of the end device or person. In the embodiments described herein, the P2P protocol is acting as the transaction protocol for completing the e-commerce transaction. Additional details regarding SIMPLE are available from The Internet Engineering Task Force ("IETF"). It should be appreciated that any P2P protocol capable of creating a secure P2P communications channel between three or more P2P nodes may be utilized.

Figure 2:
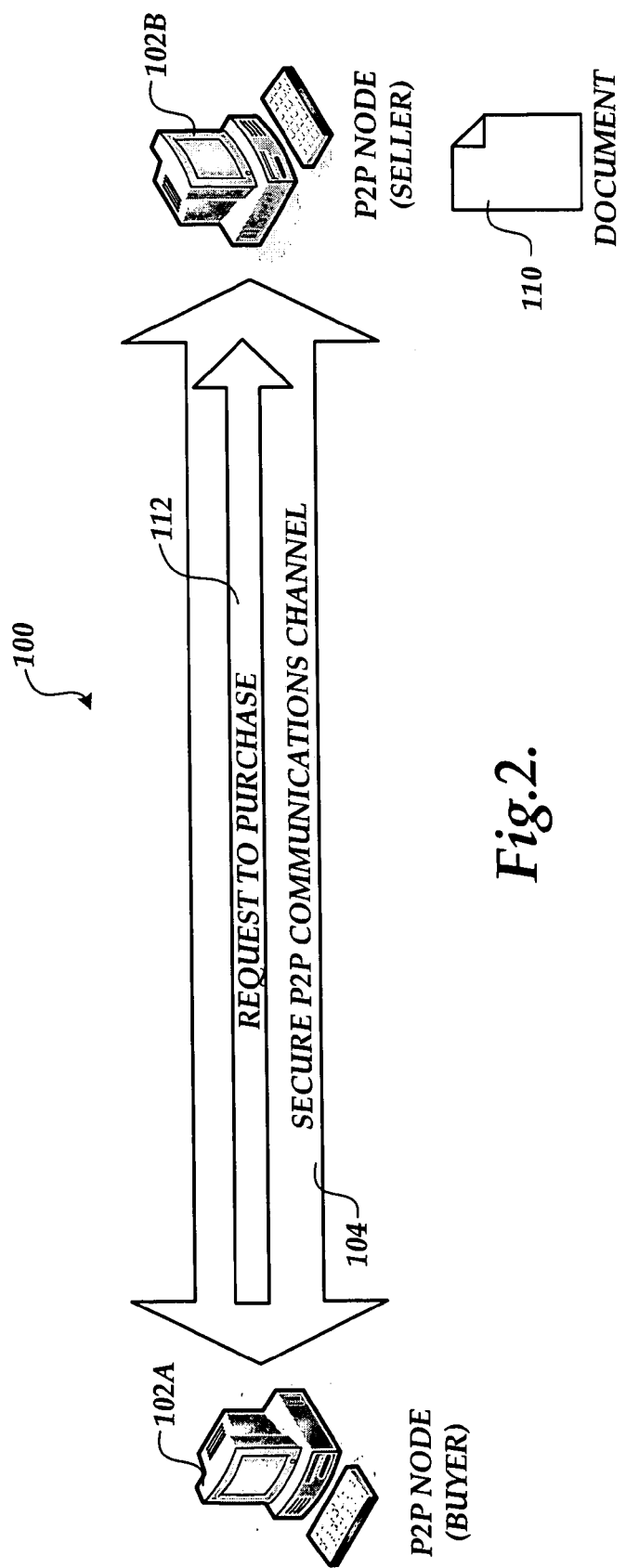
FIGS. 2-6 are network diagrams illustrating aspects of the communication between a buyer node, a seller node, and a clearinghouse server computer provided herein.

Referring now to FIG. 2, additional details regarding the embodiments provided herein for performing an e-commerce transaction over a P2P communications channel will be provided. As shown in FIG. 2, the nodes 102A-102B first create a two-party secure P2P communications channel 104. As discussed above, the nodes 102A-102B may utilize the services of the IM server 108 to establish the connection. Once the channel 104 has been established between the nodes 102A and 102B, text, audio, and video may be transmitted between the nodes 102A-102B over the channel 104. File transfers may also take place over the channel 104.

During the course of a communications session between the nodes 102A-102B, the parties may agree to perform an e-commerce transaction. For instance, in the example shown in FIG. 2, the document 110 has been offered for sale by an operator of the node 102B and an operator of the node 102A has offered to buy the document 110. Accordingly, a request 112 to purchase the document 110 is transmitted over the P2P communications channel 104 from the node 102A to the node 102B. The request 112 may take the form of text or other data that indicates to the node 102B that the node 102A is initiating an e-commerce transaction.

Figure 3:
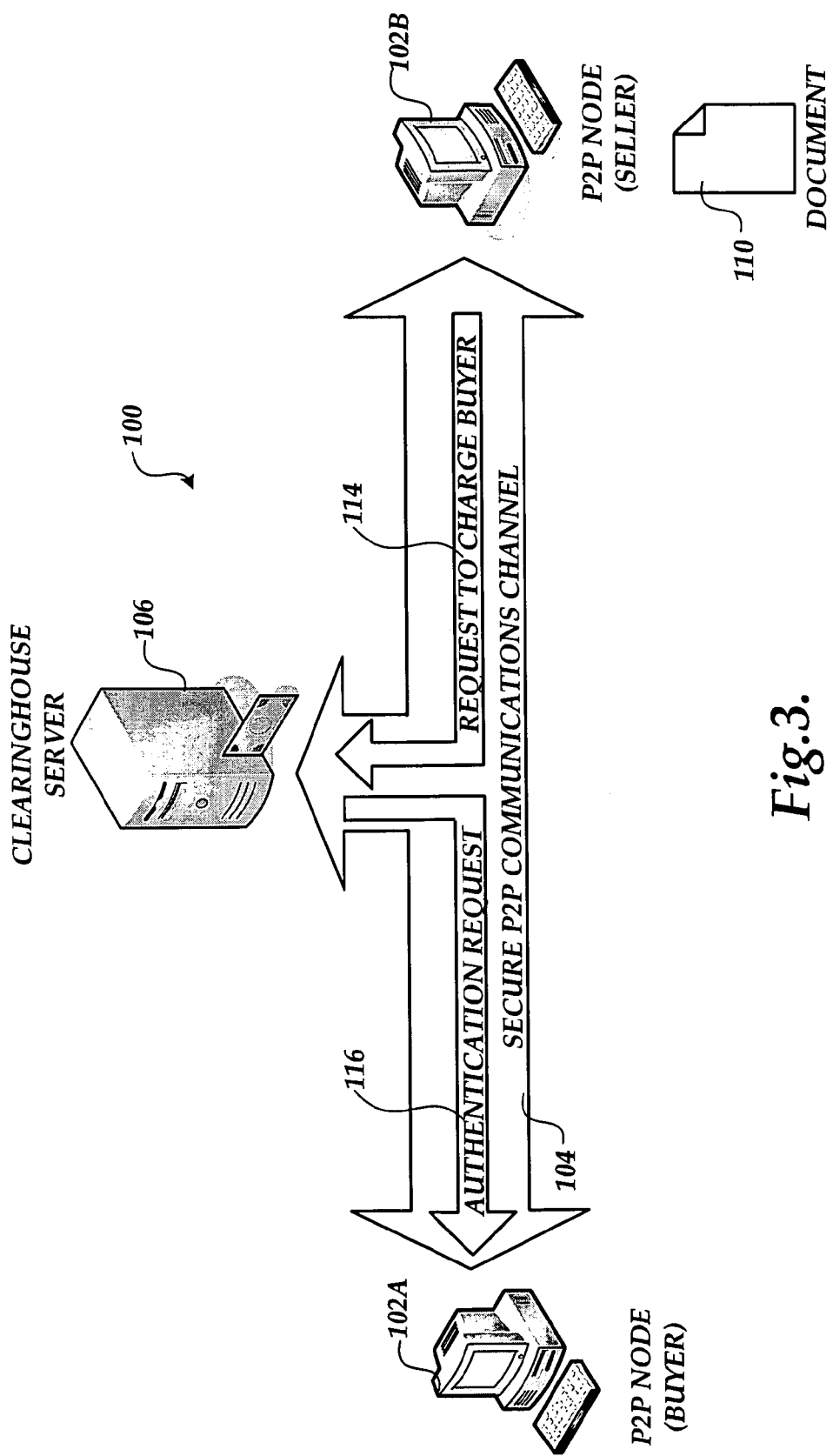

FIG. 3 illustrates the processing performed by the nodes 102A-102B and the clearinghouse server 106 following the receipt by the node 102B of a request to purchase. In particular, in response to such a request, the node 102B conferences the clearinghouse server 106 into the P2P communications channel 104. As discussed briefly above, the clearinghouse server 106 provides functionality for acting as a mediator of the e-commerce transaction, performing backend settlement and physical payment processing, for validating transfer, receipt, and conformance of the goods, and for providing escrow services. Each of these functions is described in greater detail below.

Once the clearinghouse server 106 has joined the P2P communications channel 104, the node 102B transmits a request 114 to charge an account associated with the node 102A for the purchase of the good. The request 114 is also transmitted over the P2P communications channel 104. The operator of the node 102A may already have a relationship with the operator of the clearinghouse server 106. In this case the clearinghouse server 106 will already have an account set up for the user of the node 102A. If no relationship exists, the operator of the node 102A may be requested to create a new account. It should be appreciated that the node 102A may transmit the request to charge the account to the server 106.

In response to receiving the request to charge an account associated with the node 102A, the server 106 makes an attempt to validate the identity of the user of the node 102A. In particular, according to one embodiment, the server 106 transmits an authorization request 116 to the node 102A. The request 106 asks the node 102A to provide data to the server 106 through which the identity of the user of the node 102A may be verified. For instance, the request 116 may be for a digital signature through which the identity of the operator of the node 102A may be verified. The request 116 is also transmitted over the P2P communications channel 104.

Figure 4:
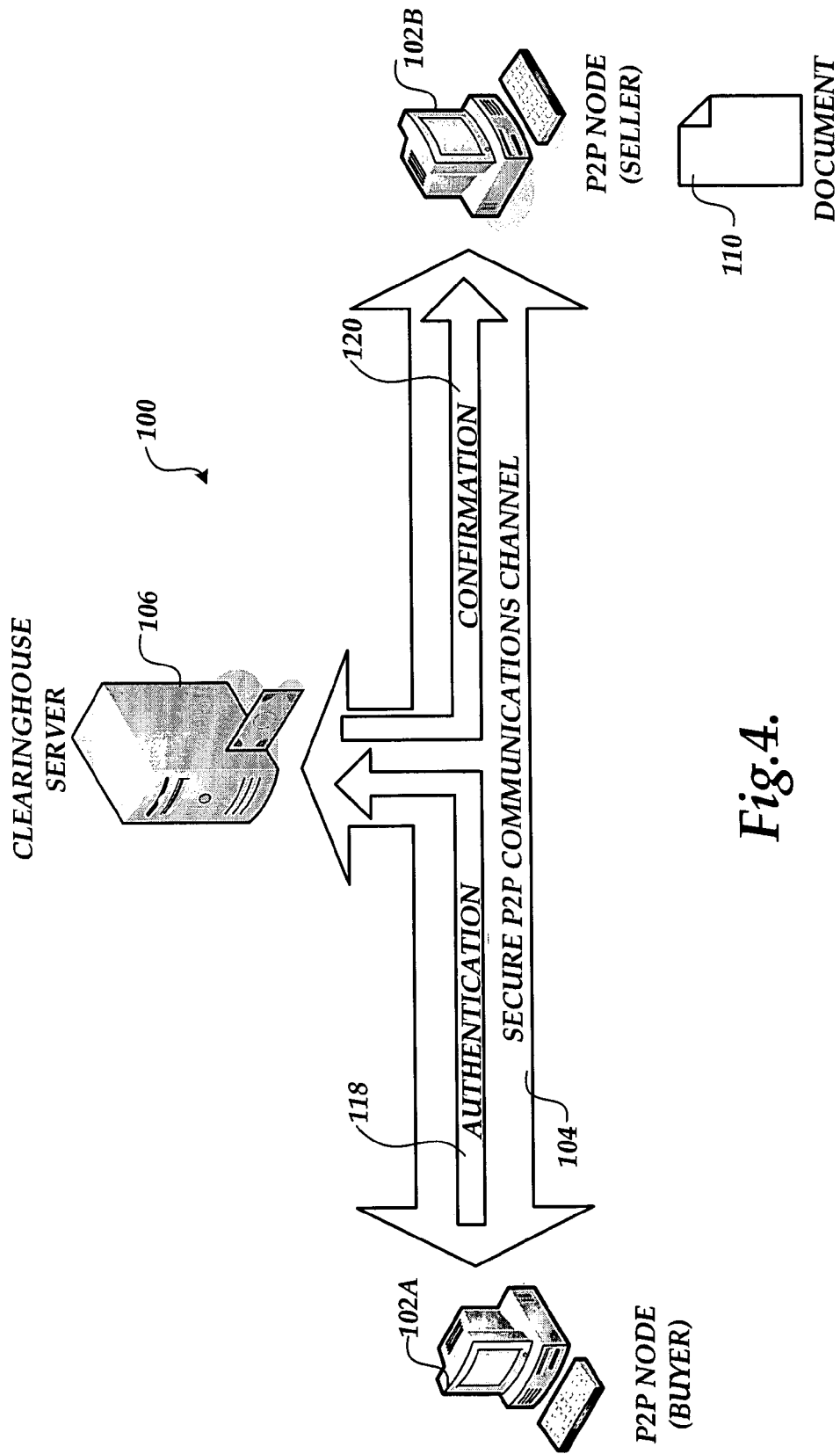

FIG. 4 illustrates additional processing performed by the node 102A and the clearinghouse server 106 following the receipt of a request for authentication at the node 102A. In particular, in response to receiving an authentication request at the node 102A, authenticating data 118 may be transmitted from the node 102A to the clearinghouse server 106. This data may take the form of a digital signature that verifies the identity of the operator of the node 102A.

Once the clearinghouse server 106 has received the authenticating data, the requested charge is made against the account associated with the node 102A. Once the charge has been made, a confirmation 120 is transmitted to the node 102B. The confirmation 120 indicates to the node 102B that the requested charge has been made. The confirmation 120 is transmitted over the P2P communications channel 104.

Figure 5:
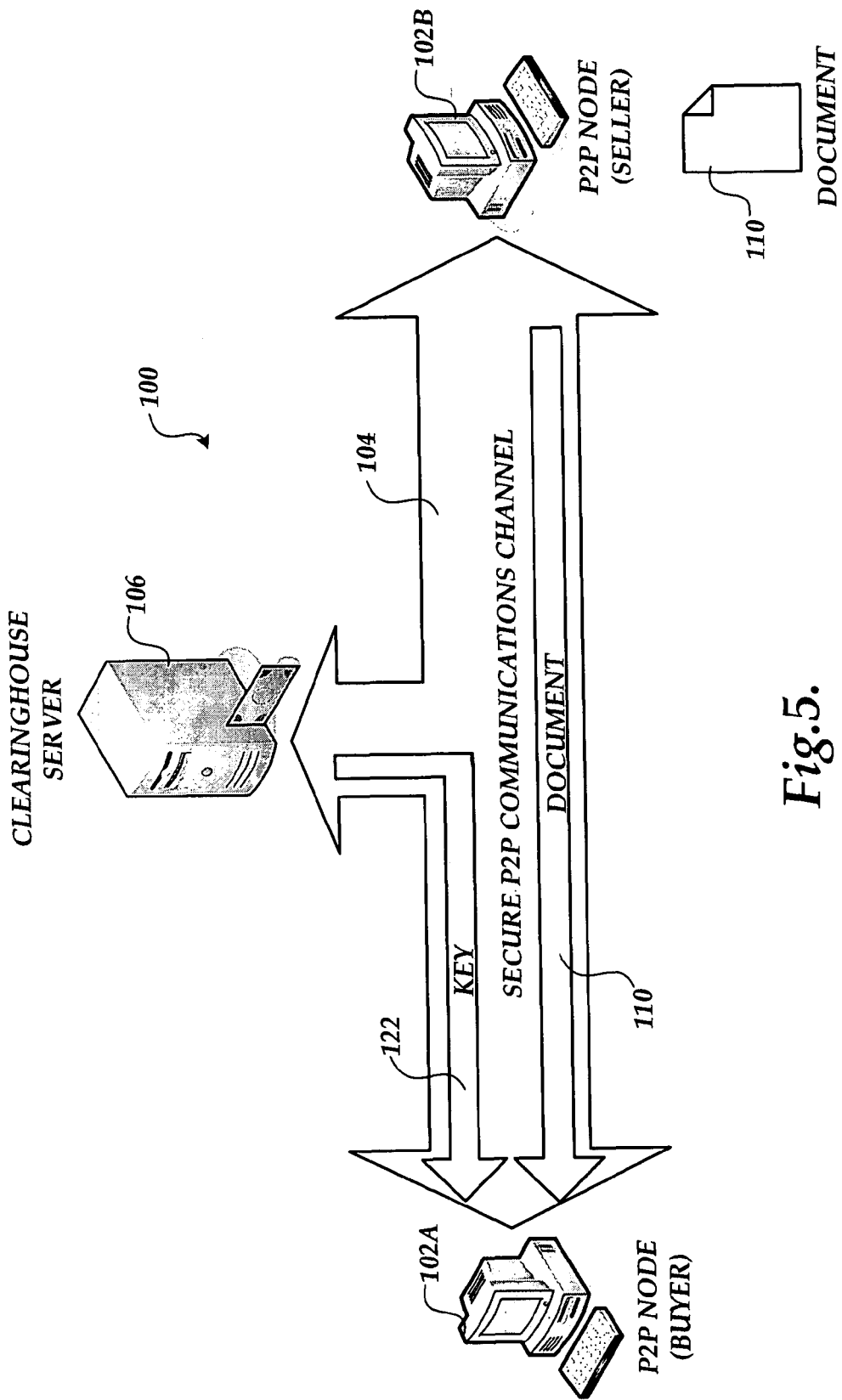

FIG. 5 illustrates additional processing performed by the node 102B and the clearinghouse server 106 following the transmission of a confirmation 120 to the node 102B. In particular, in response to receiving the confirmation 120, the node 102B transmits the digital good to the node. 102A. In the example shown in FIG. 5, the node 102A transmits the document 110 to the node 102A. In an alternative embodiment, the clearinghouse server 106 transmits the good to the node 102A following receipt of payment.

It should be appreciated that the digital good that is the subject of the e-commerce transaction may be encrypted or decrypted. If the good is encrypted, the clearinghouse server 106 may be operative to transmit a key 122 for decrypting the good to the node 102A following the receipt of payment. The key 122 is transmitted to the node 102A over the P2P communications channel 104.

Figure 6:
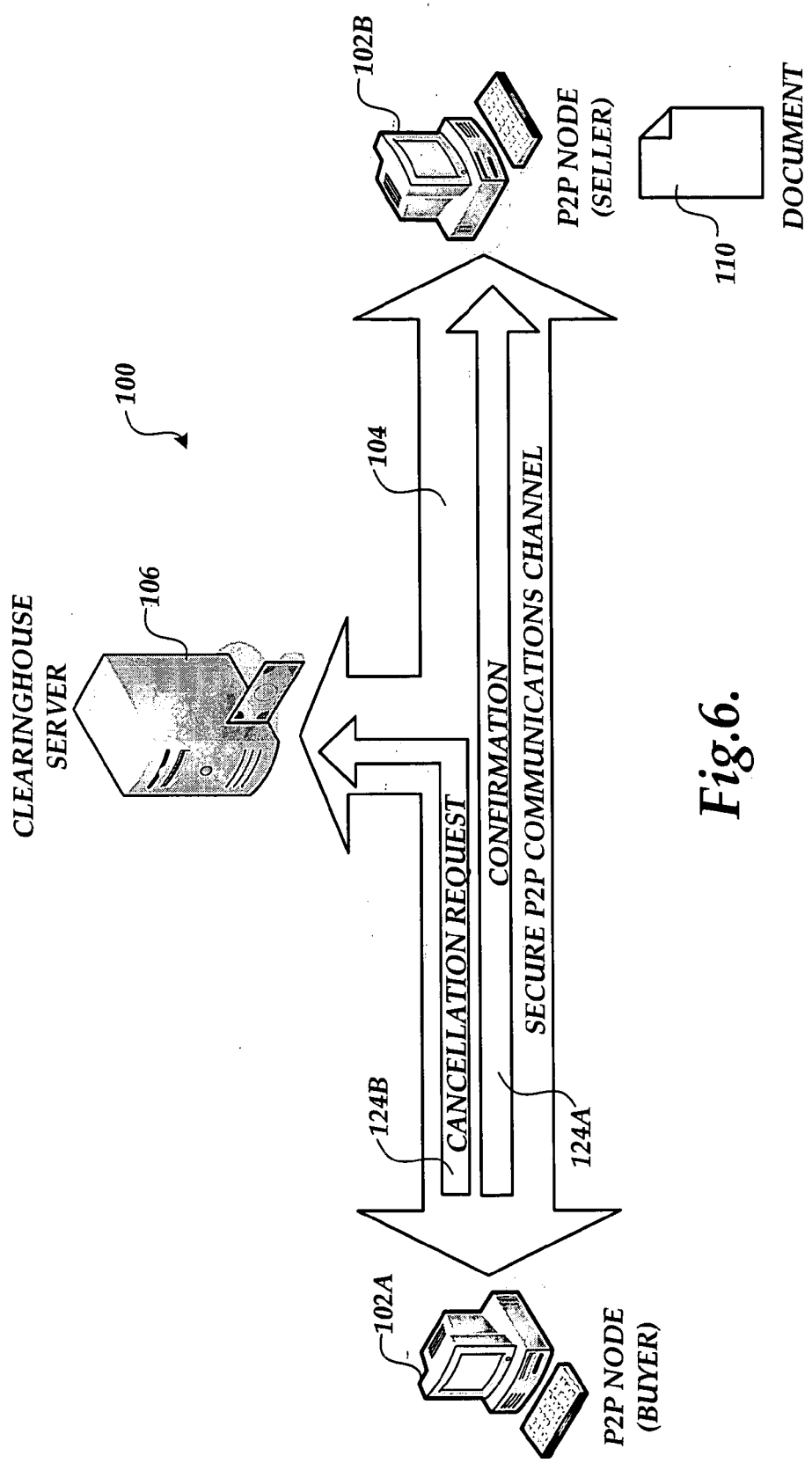

FIG. 6 illustrates additional processing performed by the node 102A and the clearinghouse server 106 following the receipt of the key 122 at the node 102A. In particular, when the node 102A receives the key 122, it attempts to decrypt the good using the key 122. If the node 102A successfully decrypts the good, a confirmation message 124A is transmitted to the node 102B and to the clearinghouse server 106. If the node 102A cannot decrypt the good using the key 122, a cancellation request message 124B is transmitted to the clearinghouse server 106. The message 124B requests that the e-commerce transaction be cancelled and that the account associated with the node 102A be credited for the cancelled transaction. Additional processing may be performed by the clearinghouse server 106 to determine whether the transaction should actually be cancelled and a credit applied. The node 102B may also be given notice of the cancellation request and permitted to intervene and supply conforming goods before the cancellation takes place.

Figure 7A:
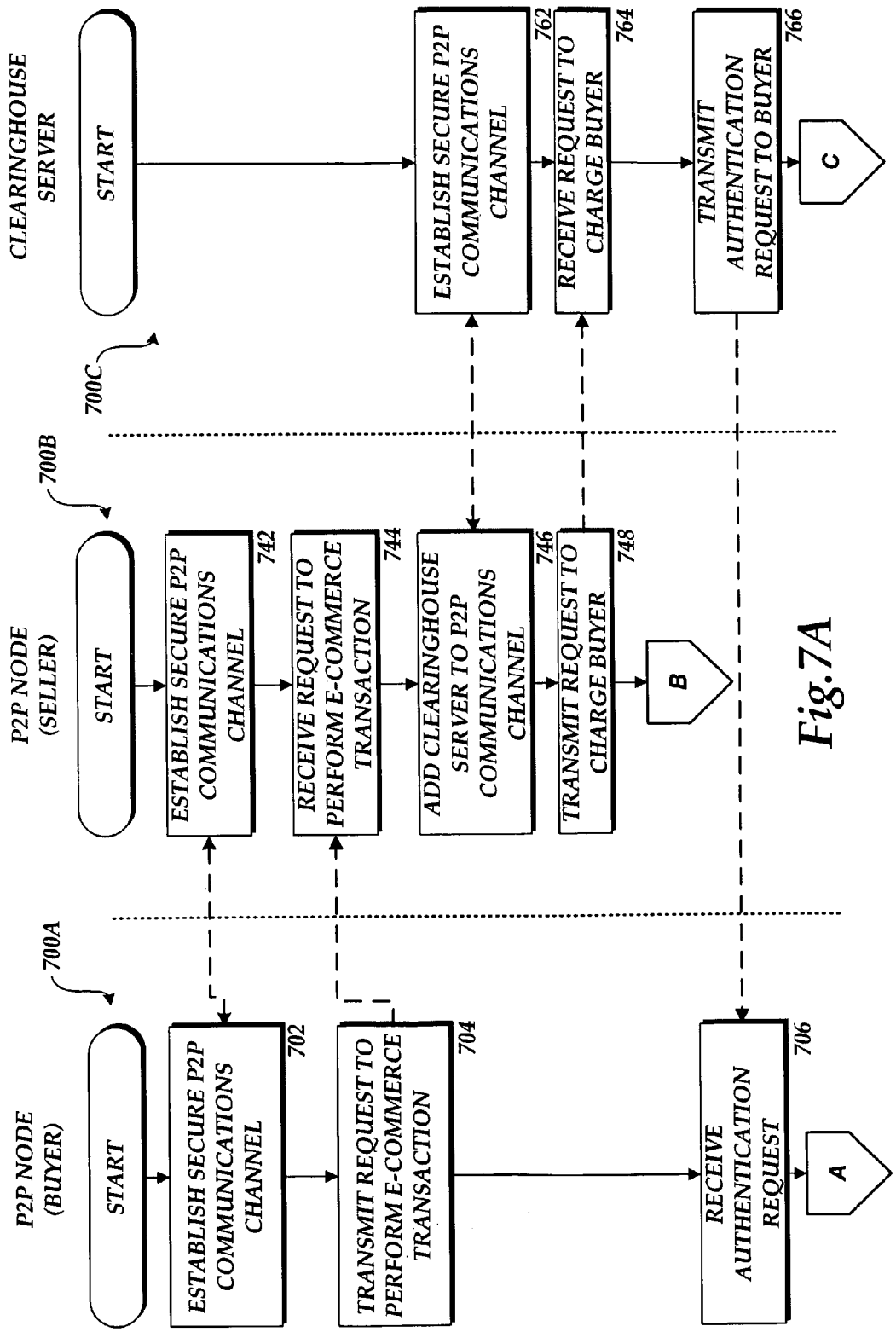
FIGS. 7A-7B are flow diagrams showing illustrative processes provided herein for performing an e-commerce transaction over a P2P communications channel.
Figure 7B:
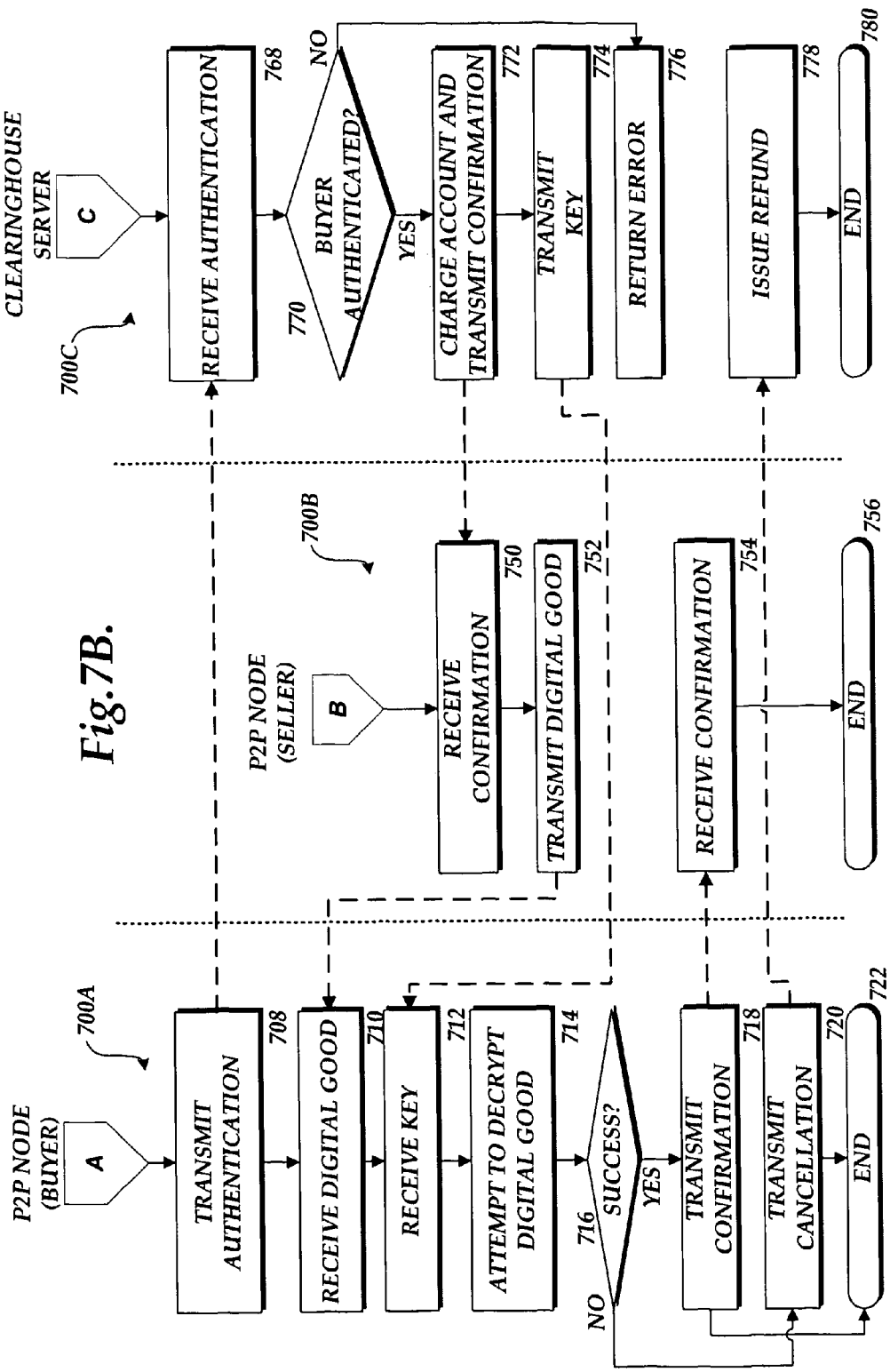

Turning now to FIGS. 7A-7B, several illustrative routines 700A-700C will be described showing the operation of the buyer node 102A, the seller node 102B, and the clearinghouse server 106, respectively. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routines 700A and 700B begin at processing operations 702 and 742, respectively, where the nodes 102A-102B establish a secure P2P communications channel 104 with one another. Once the communications channel 104 has been established, the routine 700A continues to operation 704, where a request to perform the e-commerce transaction is transmitted from the node 102A to the node 102B over the communications channel 104. The request is received by the node 102B at operation 744. In response to receiving the request, the node 102B adds the clearinghouse server 106 to the communications channel at operation 746 and operation 762 of the routine 700C.

Once the clearinghouse server 106 has been added to the communications channel 104, the routine 700B continues to operation 748, where the node 102B transmits a request to the clearinghouse server 106 to charge an account associated with the operator of the node 102A. This request is received by the clearinghouse server at operation 764. In response to receiving the request, the clearinghouse server 106 transmits an authentication request to the node 102A at operation 766. This request is received by the node 102A at operation 706.

In response to receiving the authentication request, the node 102A transmits authenticating data, such as a digital signature, to the clearinghouse server at operation 708. This is received by the clearinghouse server at operation 768. The clearinghouse server 106 then determines if the received data actually authenticates the buyer at operation 770. If not, the routine 700C branches to operation 776, where an error is returned. If so, the routine 700C continues to operation 772, where the account associated with the buyer is charged. A confirmation message is also transmitted on the P2P communications channel 104 indicating that the charge has been completed. If the digital good is encrypted, the clearinghouse server 106 also transmits a key to the node 102A for decrypting the digital good.

In response to receiving the confirmation message at operation 750, the node 102B transmits the digital good to the node 102A at operation 752. The node 102A receives the digital good at operation 710 and the key at operation 712. The node 102A then attempts to decrypt the digital good with the key. If the key successfully decrypts the good, then the routine 700A continues to operation 718 where a confirmation message is transmitted to the node 102B. The node 102B receives the confirmation message at operation 754.

If the key cannot decrypt the good then the routine 700A branches to operation 720. At operation 720, a request to cancel the e-commerce transaction and issue a refund is transmitted by the node 102A to the clearinghouse server 106. At operation 778, the clearinghouse server 106 receives the request and issues the refund. The routines 700A-700C end at operations 722, 756, and 780, respectively.

Figure 8:
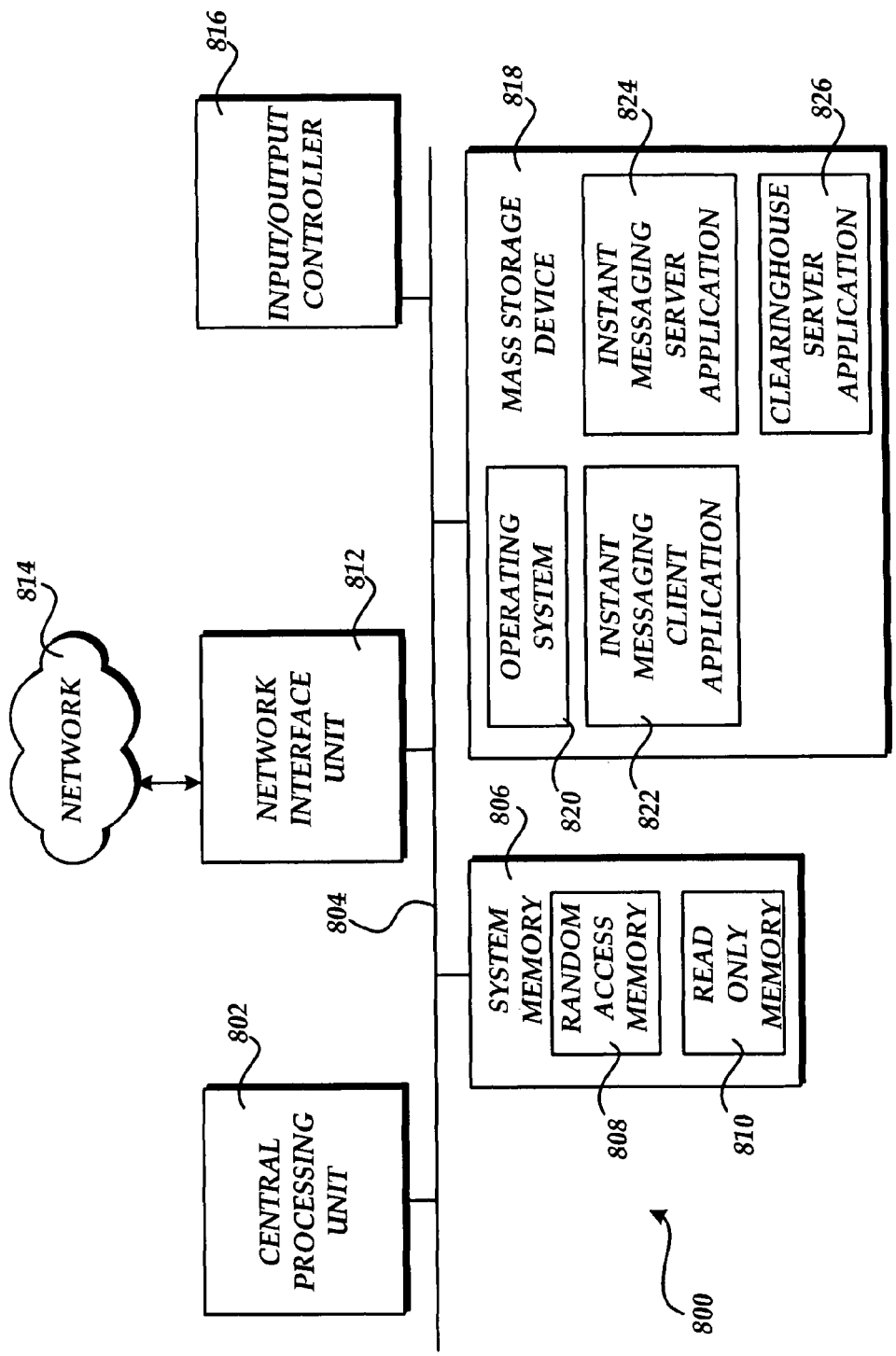
FIG. 8 is a computer architecture diagram showing a computer architecture suitable for implementing the various computer systems described herein.

Referring now to FIG. 8, an illustrative computer architecture for a computer 800 utilized in the various embodiments presented herein will be discussed. The computer architecture shown in FIG. 8 illustrates a conventional desktop, laptop computer, handheld computer, personal digital assistant, smart phone or server computer, and may be utilized to embody the nodes 102A-102B, the clearinghouse server 106, or the IM server 108, described above. The computer 800 may also be a proxy computer for a device such as a cell phone where the proxy would provide a service on behalf of that device which itself may not be capable of the specific P2P protocol, data encryption/decryption or signaling used in the e-commerce transaction. The services would include data and protocol translation such that the device could participate in the transaction, but its connection to the proxy could be via a separate protocol. This would allow the e-commerce transaction capability to be provided by a network operator, such as a cellular provider, while allowing the proxy-to-device protocols to be optimized for other parameters such as over-the-air spectrum utilization.

The computer architecture shown in FIG. 8 includes a central processing unit 802 ("CPU"), a system memory 806, including a random access memory 808 ("RAM") and a read-only memory ("ROM") 810, and a system bus 804 that couples the memory to the CPU 802. A basic input/output system containing the basic routines that help to transfer information between elements within the computer 800, such as during startup, is stored in the ROM 810. The computer 800 further includes a mass storage device 818 for storing an operating system 820, application programs, and other program modules, which will be described in greater detail below.

The mass storage device 818 is connected to the CPU 802 through a mass storage controller (not shown) connected to the bus 804. The mass storage device 818 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available media that can be accessed by the computer 800.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 806.

According to various embodiments, the computer 800 may operate in a networked environment using logical connections to remote computers through a network 814, such as the Internet. The computer 800 may connect to the network 814 through a network interface unit 812 connected to the bus 804. It should be appreciated that the network interface unit 812 may also be utilized to connect to other types of networks and remote computer systems. The computer 800 may also include an input/output controller 816 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 818 and RAM 808 of the computer 800, including an operating system 820 suitable for controlling the operation of a networked computer, such as the WINDOWS XP operating system from MICROSOFT CORPORATION of Redmond, Wash. The mass storage device 818 and RAM 808 may also store one or more program modules. In particular, the mass storage device 20 and the RAM 9 may store an IM client application program 822. The IM client application program 822 is executed by the nodes 102A-102B and is operative to perform the functionality described herein for establishing the P2P communications channel 104 and exchanging data between the nodes 102A-102B, the clearinghouse server 106, and the IM server 108.

The mass storage device 14 and the RAM 9 are also operative to store an IM server application 824. The IM server application 824 is executed by the IM server 108 to provide the functionality described above. The mass storage device 14 and the RAM 9 may also store the clearinghouse server application 826. The clearinghouse server application 826 is executed by the clearinghouse server 106 to perform the functions described above. The mass storage device 818 may also store other types of programs and databases as necessary to provide the functionality described herein.

Based on the foregoing, it should be appreciated that systems, methods, and computer-readable media for performing an e-commerce transaction over a P2P communications channel are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for performing an electronic commerce transaction utilizing a peer-to-peer (P2P) communications channel, the method comprising:
    establishing a secure P2P communications channel between a first P2P node and a second P2P node;
    transmitting a request to perform the electronic commerce transaction over the secure P2P communications channel;
    in response to receiving the request, adding a third P2P node to the secure P2P communications channel;
    transmitting a request over the secure P2P communications channel to the third P2P node to charge an account associated with the first P2P node;
    receiving confirmation over the secure P2P communications channel from the third P2P node that the charge has been completed; and
    in response to receiving the confirmation, transmitting a good associated with the electronic commerce transaction to the first P2P node over the secure P2P communications channel.

2. The method of claim 1, wherein the secure P2P communications channel is established utilizing a P2P protocol.

3. The method of claim 2, wherein the secure P2P protocol comprises the Session Initiation Protocol for Instant Messaging and Presence Leveraging (SIMPLE) protocol.

4. The method of claim 3, further comprising prior to receiving confirmation that the charge has been completed:
    authenticating the first P2P node at the third P2P node; and
    in response to authenticating the first P2P node at the third P2P node, charging the account associated with the first P2P node for the electronic commerce transaction.

5. The method of claim 4, wherein transmitting to the first P2P node a good associated with the electronic commerce transaction comprises transmitting an unencrypted digital good from the second P2P node to the first P2P node over the secure P2P communications channel.

6. The method of claim 4, wherein transmitting a good associated with the electronic commerce transaction to the first P2P node over the secure P2P communications channel comprises:
    transmitting an encrypted digital good from the second P2P node to the first P2P node over the secure P2P communications channel; and
    transmitting a key for decrypting the digital good from the third P2P node to the first P2P node over the secure P2P communications channel.

7. The method of claim 6, further comprising:
    attempting to decrypt the digital good utilizing the key;
    in response to determining that the key successfully decrypted the digital good, transmitting a confirmation message to the third P2P node over the secure P2P communications channel; and
    in response to determining that the key did not decrypt the digital good, transmitting a request to cancel the electronic commerce transaction to the third P2P node over the secure P2P communications channel.

8. A computer-readable storage media that is not a signal having computer-executable instructions stored thereupon which, when executed by a computer, cause the computer to:
    receive a request from a P2P node to purchase a digital good via a P2P communications channel;
    in response to the request, to add a clearinghouse server computer to the P2P communications channel and to transmit to the clearinghouse server computer via the P2P communications channel a request to charge an account associated with the P2P node for the digital good;
    receive a confirmation message from the clearinghouse server computer on the P2P communications channel indicating that the account was successfully charged; and in response to receiving the confirmation message, transmitting an encrypted digital good to the P2P node via the P2P communications channel, and wherein the clearinghouse server computer is operative to authenticate the P2P node and to transmit a key to decrypt the encrypted digital good to the P2P node via the P2P communications channel in response to successfully charging the account.

9. The computer-readable medium of claim 8, wherein the P2P communications channel is established utilizing the Session Initiation Protocol for Instant Messaging and Presence Leveraging (SIMPLE) protocol.

10. A method for completing an electronic commerce transaction over a peer-to-peer (P2P) communications channel, the method comprising:

joining a clearinghouse server to a secure P2P communications channel between a first P2P node and a second P2P node in response to a request from the first P2P node such that the clearinghouse server receives all communications transmitted on the P2P communications channel by the P2P nodes and such that the P2P nodes receive all communications transmitted on the P2P communications channel by the clearinghouse server;

receiving at the clearinghouse server via the P2P communications channel a request to charge an account associated with the second P2P node;

attempting to authorize the charge by way of the clearinghouse server by transmitting a request for authorization from the clearinghouse server to the second P2P node on the P2P communications channel, and receiving a digital signature on the P2P communications channel from the P2P node at the clearinghouse server authorizing the charge; and in response to determining that the charge is authorized at the clearinghouse server, transmitting a confirmation message from the clearinghouse server to the first P2P node on the P2P communications channel indicating that the charge was made.

11. The method of claim 10, further comprising in response to determining that the charge is authorized, transmitting from the clearinghouse server to the second P2P node on the P2P communications channel a key for decrypting an encrypted digital good.

12. The method of claim 11, further comprising receiving an indication from the second P2P node at the clearinghouse server that the key could not be utilized to decrypt the digital good and reversing the charge in response thereto.

* * * * *